(12) United States Patent
Takaki et al.

(10) Patent No.: US 7,244,065 B2
(45) Date of Patent: Jul. 17, 2007

(54) WHEEL SUPPORT BEARING ASSEMBLY AND ANGULAR BALL BEARING

(75) Inventors: Masuo Takaki, Osaka (JP); Kazuhiko Hozumi, Osaka (JP)

(73) Assignee: NTN Corporation, Osaka (JP)

( * ) Notice: Subject to any disclaimer, the term of this patent is extended or adjusted under 35 U.S.C. 154(b) by 51 days.

(21) Appl. No.: 11/002,066

(22) Filed: Dec. 3, 2004

(65) Prior Publication Data

US 2005/0135719 A1 Jun. 23, 2005

(30) Foreign Application Priority Data

Dec. 22, 2003 (JP) .............................. 2003-424627

(51) Int. Cl.
*F16C 33/41* (2006.01)
(52) U.S. Cl. .................. 384/544; 384/523; 384/531
(58) Field of Classification Search ................ 384/544, 384/523, 525–534
See application file for complete search history.

(56) References Cited

U.S. PATENT DOCUMENTS

| | | | | |
|---|---|---|---|---|
| 1,311,769 A | * | 7/1919 | Ohlsson | 384/533 |
| 4,240,681 A | * | 12/1980 | Stolz et al. | 384/512 |
| 4,804,276 A | * | 2/1989 | Olschewski et al. | 384/526 |
| 5,387,041 A | * | 2/1995 | Lederman | 384/531 |
| 6,007,253 A | * | 12/1999 | Rutter | 384/544 |

OTHER PUBLICATIONS

Katogi Teiji, Patent Abstracts of Japan, "Hub Bearing Unit", Publication No.: 2002-195254, Publication Date: Jul. 10, 2002.

* cited by examiner

*Primary Examiner*—Thomas R. Hannon

(57) ABSTRACT

There is provided a wheel support bearing assembly (1) utilizing a dual row angular ball bearing. The bearing assembly (1) includes two ball retainers (5) for retaining corresponding rows of balls (4). One or both of the retainers (5) is so designed that the neighboring balls (4) can adjoin directly in a non-contact fashion relative to each other on a pitch circle PCD of the row of the balls (4). For example, the ball retainer (5) is of a generally comb-shape having a plurality of pillars (5*b*) each formed with a throughhole (13) aligned on the pitch circle PCD.

6 Claims, 6 Drawing Sheets

Fig. 2A
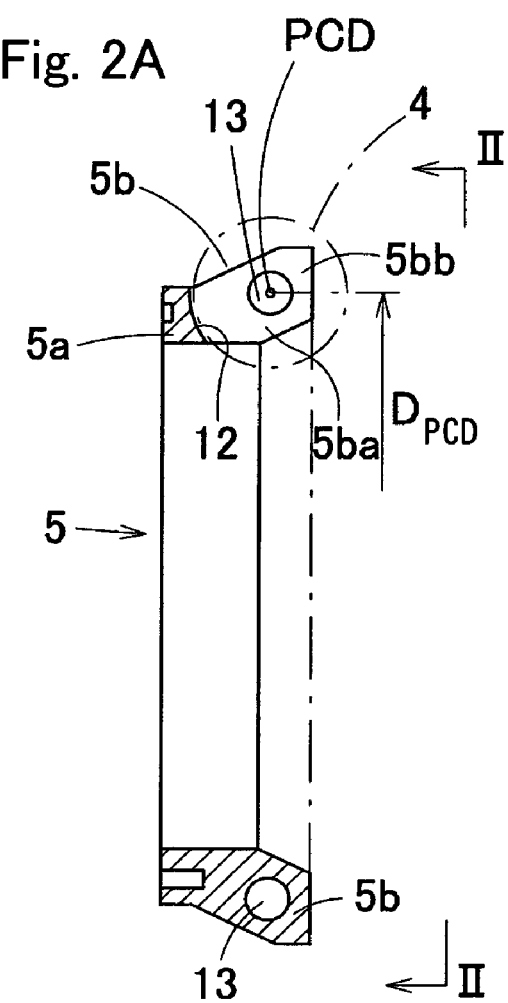
Fig. 2B
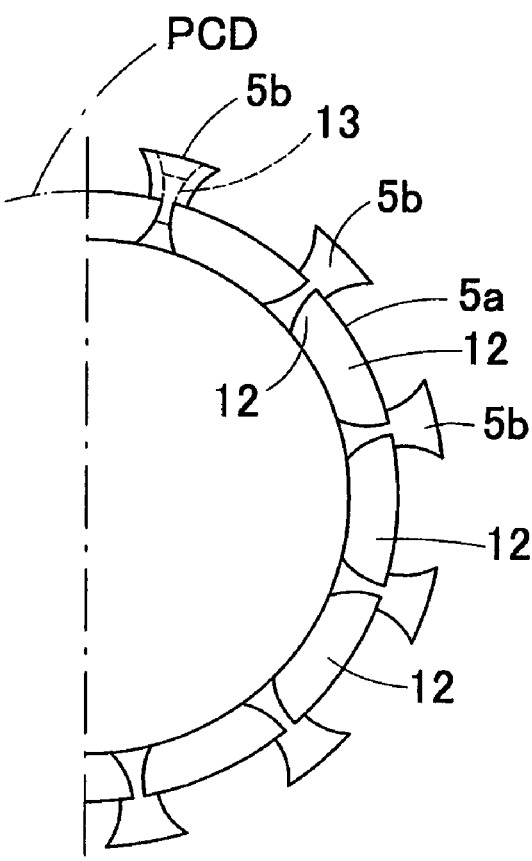
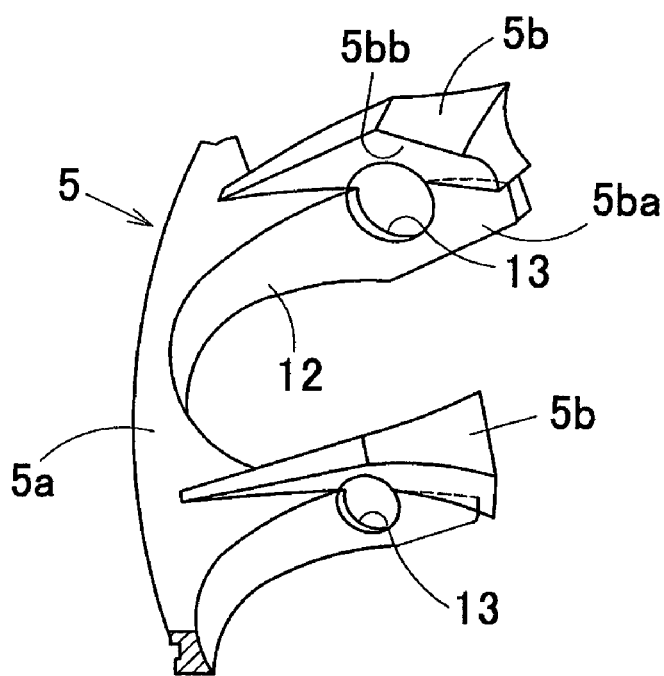
Fig. 2C

WHEEL SUPPORT BEARING ASSEMBLY AND ANGULAR BALL BEARING

BACKGROUND OF THE INVENTION

1. Field of the Invention

The present invention relates to a wheel support bearing assembly for rotatably supporting a wheel relative to a vehicle body structure in automotive vehicles such as automobiles and also relates to an angular ball bearing for use in various applications.

2. Description of the Prior Art

For the wheel support bearing assembly, a dual row angular ball bearing is largely employed, in which dual rows of balls are rollingly interposed between outer and inner members at a predetermined contact angle. In such a dual row angular ball bearing, the balls of each row are retained by a respective ball retainer in circumferentially equidistantly spaced relation to each other and are prevented by the ball retainer from contacting with each other.

In wheel support bearing assemblies available in recent years, from the perspective of increasing the freedom of design choice of the automotive vehicles and the mileage and of facilitating the maintenance and reduction of the cost, the needs have arisen to further increase the lifetime and the rigidity of the wheel support bearing assembly, to manufacture the wheel support bearing assembly in a compact size and light-weight feature.

In an attempt to satisfy those needs, the Japanese Laid-open Patent Publication No. 2002-195254, for example, discloses a wheel support bearing assembly, in which one of the dual rows of balls, for example, an inboard row of balls, which is positioned remote from a vehicle wheel supported by the wheel support bearing assembly, makes no use of a ball retainer, i.e., represents a full complement ball bearing. The full complement ball bearing with no ball retainer employed is particularly advantageous in that the number of the balls can be increased, reducing a bearing load imposed on each of those balls. For this reason, the wheel support bearing assembly can have an increased lifetime and can also be manufactured in a compact size having a light-weight feature.

Although in the full complement ball bearing the number of the balls can be increased as compared with the bearing assembly utilizing the ball retainers, it has been well recognized that the neighboring balls contact with each other. Considering that during the operation of the bearing assembly the balls rotate in the same direction about their own center axes, the respective surfaces of the neighboring balls move in opposite directions at a contact point where such surfaces contact, with the consequence that a sliding contact or friction takes place at the contact point at a velocity that is twice the peripheral velocity of each ball. In other words, a so-called "ball-to-ball competition (ball-to-ball sliding friction)" occurs.

Once the ball-to-ball competition occurs, the frictional resistance increases. Also, in the full complement ball bearing, separation and collision of the balls repeat during the operation of the bearing assembly, which would lead to generation of rattling sounds and heat.

While the bearing assembly with the balls retained by the ball retainers is known to be advantageous in that the occurrence of the ball-to-ball competition and collision can be avoided, it is preferred that pillars in the ball retainers, that define a pocket between the neighboring pillars for accommodating the corresponding ball, may be as thin as possible in order for the number of the balls employable in the bearing assembly to be increased. The thinnest portion of the pillar needs to be aligned with the pitch circle of the row of the balls. However, to render each pillar to be thin is limited in view of the strength and manufacturing difficulty. By way of example, if each pillar is made too thin, the ball retainer is susceptible to damage at such a thin portion of the pillar and debris resulting therefrom will hamper a smooth rotation of the bearing.

The problems discussed above can be equally found in the standard angular ball bearing, particularly where the angular ball bearing is desired to be manufactured in a compact size with an increased load bearing capacity.

SUMMARY OF THE INVENTION

In view of the foregoing, the present invention is intended to provide a wheel support bearing assembly utilizing at least one ball retainer, in which the number of balls employable therein can be increased to thereby decrease the load acting on each ball and to increase the bearing lifetime while being substantially free from the problem associated with the strength of the ball retainer. The present invention is also intended to provide an angular ball bearing assembly utilizing such retainer.

In order to accomplish the foregoing objects the present invention in accordance with one aspect thereof provides a wheel support bearing assembly which includes an outer member having an inner peripheral surface formed with axially spaced outer raceways defined therein, an inner member positioned inside the outer member with an annular bearing space defined between it and the outer member, and having an outer peripheral surface formed with inner raceways defined therein in alignment with the outer raceways, in board and outboard rows of balls accommodated operatively within the annular bearing space and received in part in the outer raceways and in part in the inner raceways, and at ball retainer for retaining the corresponding row of balls. The neighboring balls in one or both of the inboard and outboard rows are retained by the ball retainer while adjoining directly (or approaching directly) in a non-contact fashion relative to each other on a pitch circle of the row of balls.

It is to be noted that the terms "adjoin directly" or "approach directly" referred to above and hereinafter are intended to convey that, on the pitch circle, nothing intervenes between the neighboring balls, but a gap of a sign is appreciable to keep the neighboring balls in a non-contact fashion relative to each other exists along the pitch circle between the balls.

According to this aspect of the present invention, the ball retainer is so designed that on the pitch circle where the neighboring balls are spaced a minimum distance from each other, the neighboring balls can adjoin directly in a non-contact fashion relative to each other and nothing, even no part of the retainer, intervene between the neighboring balls on the pitch circle. Accordingly, even though the spacing between the neighboring balls is narrowed as a result of increase of the number of the balls used, no extremely thin portion will occur in any part of the ball retainer. Because of this, even when the number of the balls is increased to a value about equal to that in the full complement ball bearing, no problem will occur which is associated with the strength of the ball retainer.

Since as discussed above the present invention makes it possible to increase the number of the balls in the wheel support bearing assembly to a value about equal to that employed in the full complement ball bearing and, hence, to decrease the load which will be imposed on the individual balls, the wheel support bearing assembly of the present invention can have an increased bearing lifetime and can also be manufactured lightweight and compact in size. Also, since the wheel support bearing assembly of the present invention utilizes the ball retainers, an undesirable increase of the frictional torque resulting from the ball-to-ball competition (sliding contact) can advantageously be avoided, accompanied by suppression of an undesirable generation of sounds and heat.

In a preferred embodiment of the present invention, the ball retainer may include a ring body and a plurality of comb-shaped pillars so formed integrally with the ring body as to extend from the ring body with a ball accommodating pocket defined between the neighboring pillars. In this case, a throughhole is defined in each of the pillars at a location aligned with the pitch circle. The throughhole may be a hole having, for example, a circular sectional shape, or may be a cutout opening between the tips of the pillars.

The formation of the throughhole in each of the pillars allow the neighboring balls to adjoin directly therethrough and, accordingly, while the ball retainer is of one-piece construction, the balls can be retained by the ball retainer, adjoining directly with each other on the pitch circle.

In another preferred embodiment of the present invention, the ball retainer may include first and second retainer segments. In this case, the first and second retainer segments may be positioned radially inwardly and outwardly relative to each other within the annular bearing space. Each of the first and second retainer segments includes a ring body and a plurality of comb-shaped pillars so formed integrally with the ring body as to extend from the ring body with a ball accommodating pocket defined between the neighboring pillars. The first and second retainer segments are used to retain the balls at respective locations radially inwardly and outwardly of the pitch circle. The pillars of those first and second retainer segments extend in the same axial direction.

Where the ball retainer is made up of the first and second retainer segments, the first and second retainer segments may be offset in the axial direction with respect to the row of the balls. Even in this case, each of the first and second retainer segments includes a ring body and a plurality of comb-shaped pillars so formed integrally with the ring body as to extend from the ring body with a ball accommodating pocket defined between the neighboring pillars. The first and second retainer segments are in this case used to retain the balls at respective locations radially inwardly and outwardly of the pitch circle.

Where as discussed above the ball retainer is made up of the first and second retainer segments, the first and second retainer segments can have a simplified shape and can easily be manufactured while allowing the neighboring balls to adjoin directly on the pitch circle relative to each other.

The present invention in accordance with another aspect thereof provides a dual row angular ball bearing which includes ball retainers for retaining respective rows of the balls. One or both of the ball retainers retain the balls so that the neighboring balls can adjoin directly in a non-contact fashion relative to each other on a pitch circle of the row of the balls. The ball retainer employed in this angular ball bearing may be substantially identical with that employed in the wheel support bearing assembly of the structure described hereinabove.

According to the second mentioned aspect of the present invention, as is the case with the wheel support bearing assembly of the structure discussed above, the number of the balls employable can be increased even though the angular ball bearing makes use of the ball retainers. Accordingly, not only can the load acting on the individual balls be reduced, but the lifetime of the bearing assembly can also be increased with no problem associated with the strength of each of the ball retainers.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2A is a sectional view of the ball retainer;

FIG. 2B is a view of the ball retainer as viewed in a direction along the line II—II in FIG. 2A;

FIG. 2C is a fragmentary enlarged perspective view of an important portion of the ball retainer;

DETAILED DESCRIPTION OF THE EMBODIMENTS

Figure 1A:
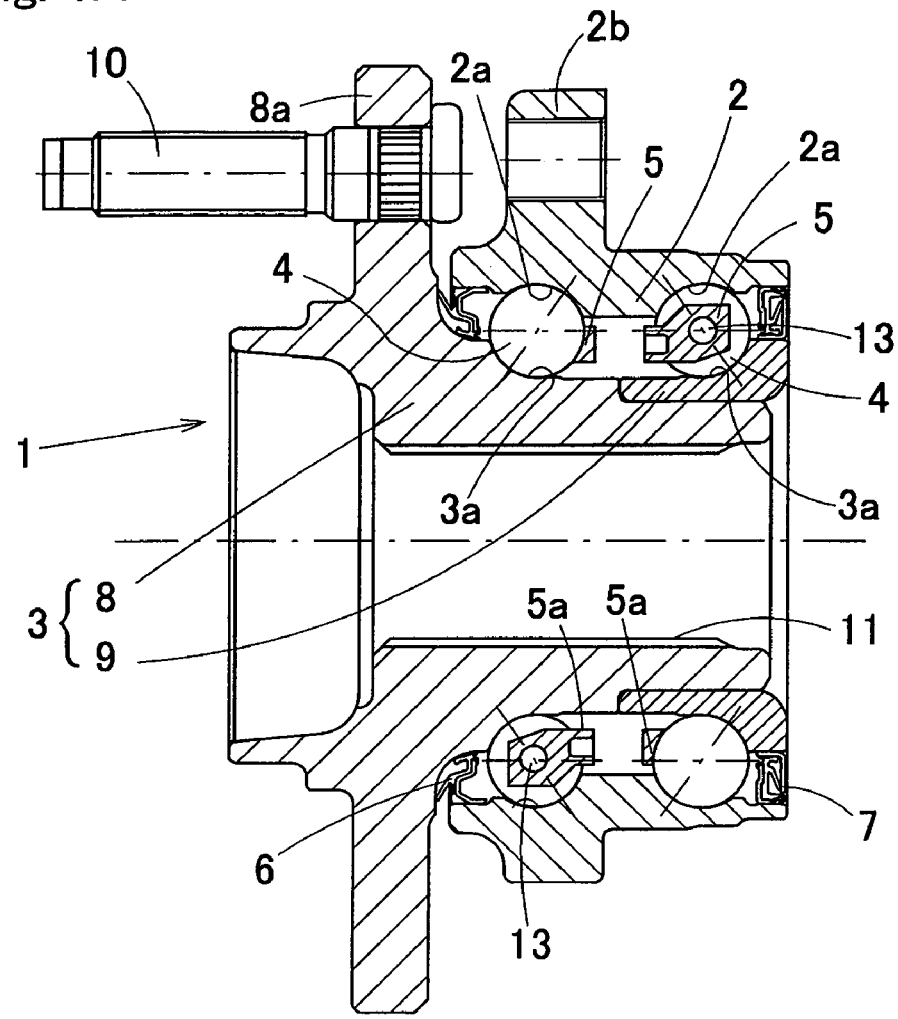
FIG. 1A is a longitudinal sectional view of a wheel support bearing assembly according to a first preferred embodiment of the present invention.

With reference to FIGS. 1A to 2C, a wheel support bearing assembly 1 according to a first preferred embodiment of the present invention will be described. This wheel support bearing assembly 1 includes a generally ring-shaped outer member 2, an inner member 3 positioned inside the outer member 2 with an annular bearing space defined between it and the outer member 2, and inboard and outboard rows of balls 4 rollingly positioned within the annular bearing space and retained by respective ball retainers 5. In the description that follows, the terms "outboard" and "inboard" are terms of position of the bearing assembly relative to a vehicle body structure, in which the bearing assembly is incorporated, and are intended to speak of a side away from the longitudinal center of the vehicle body structure and close towards the lateral side thereof and of a side towards the longitudinal center of the vehicle body structure, respectively. For example, in the instance as shown in FIG. 1, the outboard side is represented by a left-hand bearing portion including the left-hand row of the balls 4 whereas the inboard side is represented by a right-hand bearing portion including the right-hand row of the balls 4.

The outer member 2 has a mounting flange 2b so formed integrally therewith as to extend radially outwardly from an outboard end thereof, through which flange 2b the wheel support bearing assembly 1 can be secured to the vehicle body structure (not shown). This outer member 2 also has inboard and outboard raceways 2a defined in an inner peripheral surface thereof. On the other hand, the inner member 3 has an outer peripheral surface formed with inboard and outboard raceways 3a positioned in alignment with the inboard and outboard raceways 2a in the outer member 2, so that the dual rows of the balls 4 can be operatively received in part within the raceways 2a and in part within the raceways 3a, respectively, at a predetermined contact angle, for example, 35°. The outer member 2, the inner member 3 and the dual rows of the balls 4 cooperate with each other to render the bearing assembly 1 to represent a dual row angular ball bearing. It is to be noted that the contact angles of the dual rows of the balls 4 are so chosen as to achieve a back-to-back alignment or a symmetric contact. The annular bearing space delimited between the outer member 2 and the inner member 3 has its opposite annular open ends sealed by respective sealing members 6 and 7.

The inner member 3 is made up of a hub axle 8 having a bore 11 defined therein, and an inner race segment 9 fixedly mounted on an inboard end of the hub axle 8. The outboard and inboard raceways 3a of the inner member 3 are in practice defined respectively in the hub axle 8 and in the inner race segment 9.

The hub axle 8 also has a wheel mounting flange 8a so formed integrally therewith as to extend radially outwardly from an outboard end thereof. This wheel mounting flange 8a has a plurality of hub bolts 10 embedded therein. Those bolts 10 are utilized to support a brake wheel (not shown) and a tire rim of the vehicle wheel. As a matter of design, the wheel mounting flange 8a is positioned on an outboard side relative to the outer member 2.

The bore 11 defined in the hub axle 8 extends completely through the length of the hub axle 8 and is utilized to receive therein a stem portion of a coupling outer race, which forms a part of a constant velocity universal joint (not shown), so that the hub axle 8 can rotate together with the coupling outer race of the constant velocity universal joint. It is, however, to be noted that the wheel support bearing assembly 1 of FIG. 1 is for the support of a vehicle drive wheel and that particularly where the wheel support bearing assembly 1 is designed for the support of a vehicle driven wheel, the bore 11 is not always essential and the hub axle 8 may be a solid integer with no center bore.

Figure 1B:
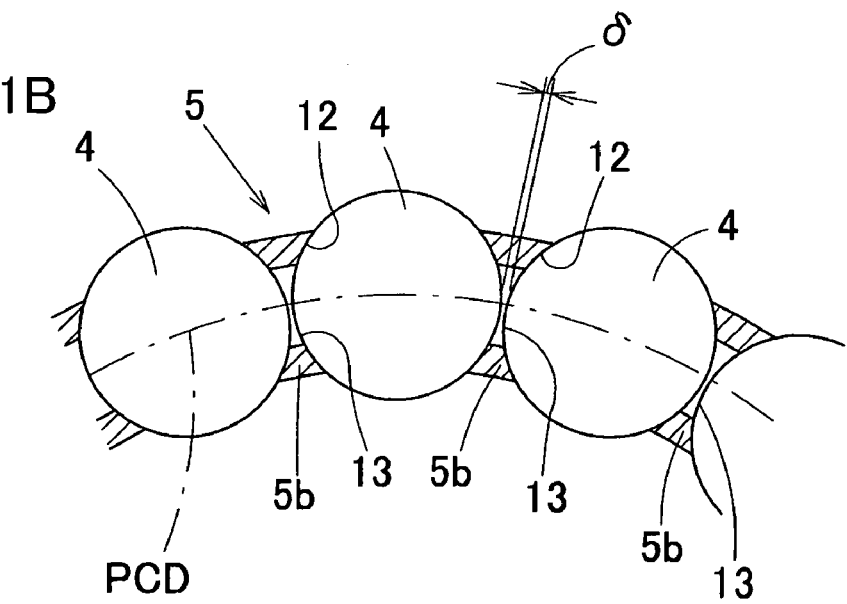
FIG. 1B is a fragmentary enlarged diagram of an important portion of a ball retainer employed therein, as viewed in a direction conforming to an axial direction of the bearing assembly.

According to the illustrated embodiment, each of the ball retainers 5 employed in the wheel support bearing assembly 1 is designed as follows. As shown in FIG. 1B, each of the ball retainers 5 is so designed that the balls 4 of the corresponding row can be retained by the ball retainer 5 having been circumferentially spaced an equal distance from each other while adjoining directly in a non-contact fashion relative to each other on the pitch circle PCD of a predetermined diameter.

The details of the ball retainer 5 will now be described with particular reference to FIGS. 2A to 2C. Each ball retainer 5 is made of a synthetic resin and is of one-piece construction including a ring body 5a and a plurality of pillars 5b so formed integrally with the ring body 5a as to extend from the ring body 5a. The pillars 5b are generally comb-shaped and spaced an equal distance from each other in a direction circumferentially of the ring body 5a, with a ball accommodating pocket 12 defined between the neighboring pillars 5b.

The ring body 5a is, as shown in FIG. 2A, so sized relative to the pitch circle PCD of the balls 4 that a major portion or a whole portion of the ring body 5a can be encompassed inside the pitch circle PCD. The pillars 5b flare outwardly, i.e., extend diagonally upwardly from the ring body 5a. Each of the pillars 5b has a throughhole 13 defined therein. The throughholes 13 are aligned with the pitch circle PCD. Through the throughholes 13, the balls 4 adjoin directly in the non-contact fashion on the pitch circle PCD. The diameter of the pitch circle PCD is indicated by $D_{PCD}$.

In an assembled condition of the wheel support bearing assembly 1, each ball retainer 5 is so positioned that the ring body 5a is positioned rearwardly of a bearing portion including the corresponding row of the balls 4. More specifically, as shown in FIG. 1A, the ball retainers 5 are so positioned that their respective ring bodies 5a face to each other between the inboard and outboard rows of the balls 4.

Referring to FIGS. 2A to 2C, respective inner surfaces of the ring body 5a and the neighboring pillars 5b, which define the corresponding ball accommodating pocket 12, are so shaped as to occupy respective portions of the spherical shape. In order for the balls 4 to be naturally non-separably retained by the corresponding ball retainer 5, the pillars 5b are elastically deformed to expand outwardly to such an extent that the ball 4 can be snapped into the corresponding pocket 12.

It is to be noted that a tip portion of each pillar 5b has an inner surface 5ba positioned radially inwardly of the pitch circle PCD and an inner surface 5bb positioned radially outwardly of the pitch circle PCD. The inner surface 5ba is made flat whereas the inner surface 5bb is made spherical, as clearly shown in FIG. 2C. The formation of the flat and spherical surfaces 5ba and 5bb are merely for the convenience of removing the retainer 5 out of a mold assembly after the retainer 5 has been molded within the mold assembly, but may not be always essential in the practice of the present invention.

As hereinbefore described, each pillar 5b has the throughhole 13 defined therein and aligned with the pitch circle PCD, so that in a retained condition in which the balls 4 of each row are retained by the corresponding ball retainer 5, the neighboring balls 4 can adjoin directly in a non-contact fashion relative to each other with a slight gap formed between the neighboring balls 4. The throuhhole 13 is shaped to be circular in such a manner that the center of the throughhole 13 is aligned with the pitch circle PCD. This gap is of a size enough to keep the neighboring balls 4 in a non-contact fashion relative to each other along the pitch circle PCD. The throughhole 13 has a diameter suitably chosen in consideration of the required strength of the pillar 5b and the gap to be taken between the neighboring balls 4.

Referring now to FIG. 1B, in the retained condition referred to above, each of the balls 4 is held in sliding contact with the inner surfaces 5bb (FIG. 2C) of the neighboring pillars 5b and, accordingly, the gap on the pitch circle PCD between the neighboring balls 4 can be regulated to a minimum size δ. This size δ of the gap may be chosen to be, for example, 0.1 mm. Assuming that no throughhole 13 is formed in each of the pillars 5b, and considering that each pillar 5b has an inner surface spherically concaved to follow the curvature of the corresponding ball 4, each pillar 5b has a thickness which is minimum on the pitch circle PCD and progressively increases in a direction radially inwardly and outwardly of the pitch circle PCD. If no throughhole 13 is employed, a minimum thickness portion of each pillar 5b which lies on the pitch circle PCD will have a thickness of 0.1 mm where the gap size δ between the neighboring balls 4 is desired to be 0.1 mm. The formation of the throughhole 13 eliminates such minimum thickness portion of the pillar 5b on the pitch circle. Accordingly, the gap between the balls 4 can be minimized while securing the overall strength of the pillar 5b.

In the wheel support bearing assembly 1 of the structure described hereinabove, since the neighboring balls 4 directly confront with each other through the throughhole 13 aligned with the pitch circle PCD where the neighboring balls 4 attain the minimum spacing therebetween, the ball retainer 5 has no extremely thin portion even though the spacing between the neighboring balls 4 is reduced as a result of increase of the number of the balls 4 employed for each row. As such, even though the number of the balls 4 of each row is increased to a value comparable with that in the full complement ball bearing, no problem will occur which is associated with the strength of the ball retainer 5.

Since as hereinabove described the number of the balls 4 employable for each row can be increased to a value about equal to that in the full complement ball bearing, the bearing load imposed on the individual balls 4 can advantageously be reduced and, therefore, not only can the lifetime of the wheel support bearing assembly 1 be increased, but the wheel support bearing assembly 1 can also be manufactured compact in size and lightweight. Also, since the use is made of the ball retainers 5 to avoid a direct contact between the neighboring balls 4, an undesirable increase of the frictional torque resulting from the ball-to-ball competition can advantageously be avoided and, also, an undesirable generation of sounds and heat can be avoided.

In this embodiment, the ball retainer 5 is of one-piece construction including the ring body 5a and the pillars 5b, while being so designed as to avoid a direct sliding contact of the neighboring balls 4, and therefore it does not require an increase of the number of component parts. Also, since the ball retainer 5 is of a generally comb-shape, the pillars 5b do not extend axially outwardly beyond the balls 4 and will not therefore constitute any obstruction to the arrangement of the sealing members 6 and 7.

Figure 3:
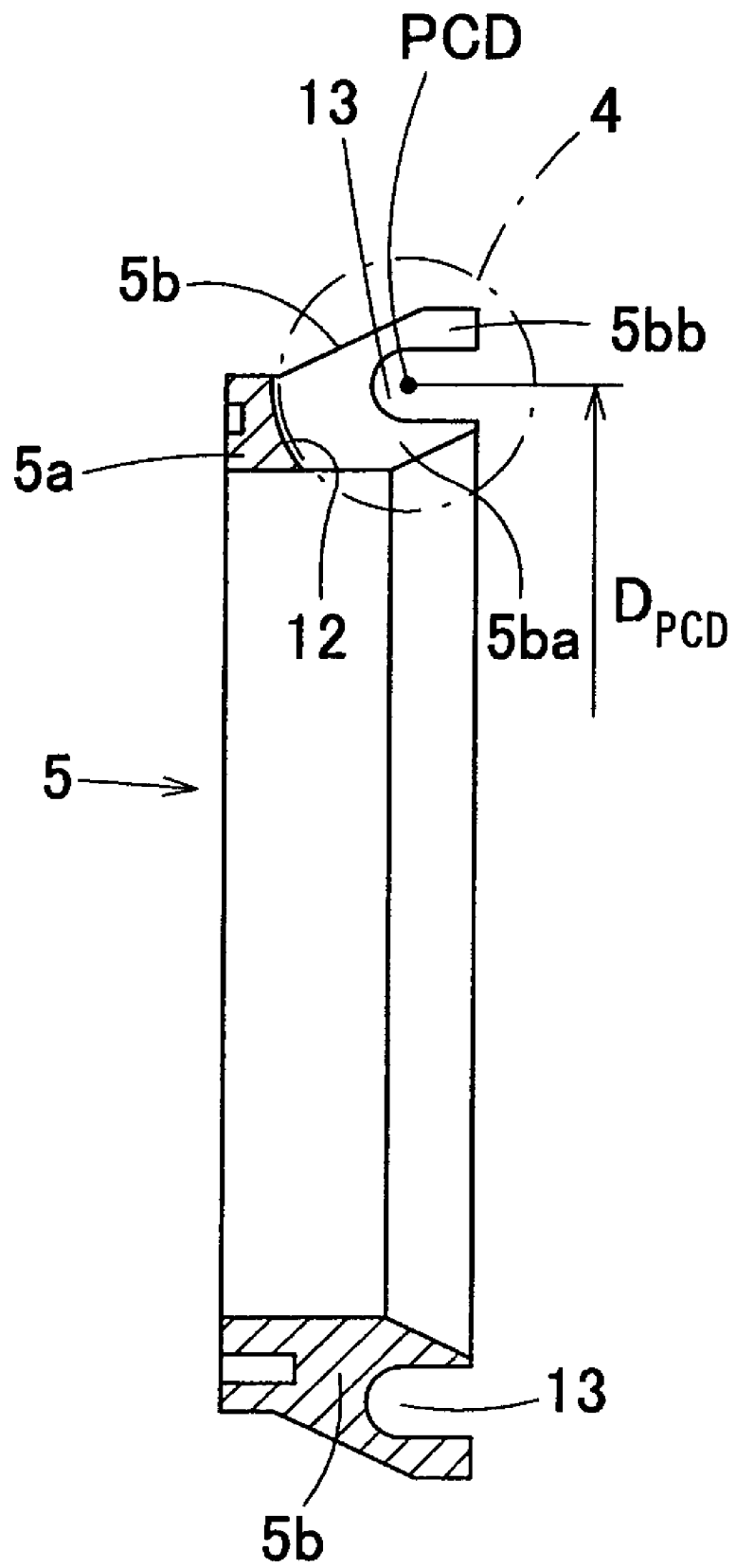
FIG. 3 is a longitudinal sectional view of the ball retainer in the wheel support bearing assembly according to a second preferred embodiment of the present invention.

The throughhole 13 is shown as having a round shape. However, in place of the round throughholes 13, a generally U-shaped cutout opening axially outwardly in a direction away from the ring body 5a may be employed in each of the pillars 5b such as in a second preferred embodiment of the present invention shown in FIG. 3. Where the generally U-shaped cutouts are employed in those pillars 5b of each ball retainer 5, formation of each ball retainer 5 by means of a plastic injection molding technique merely requires the use of a simple mold assembly (not shown) of, for example, two-piece construction.

Figure 4:
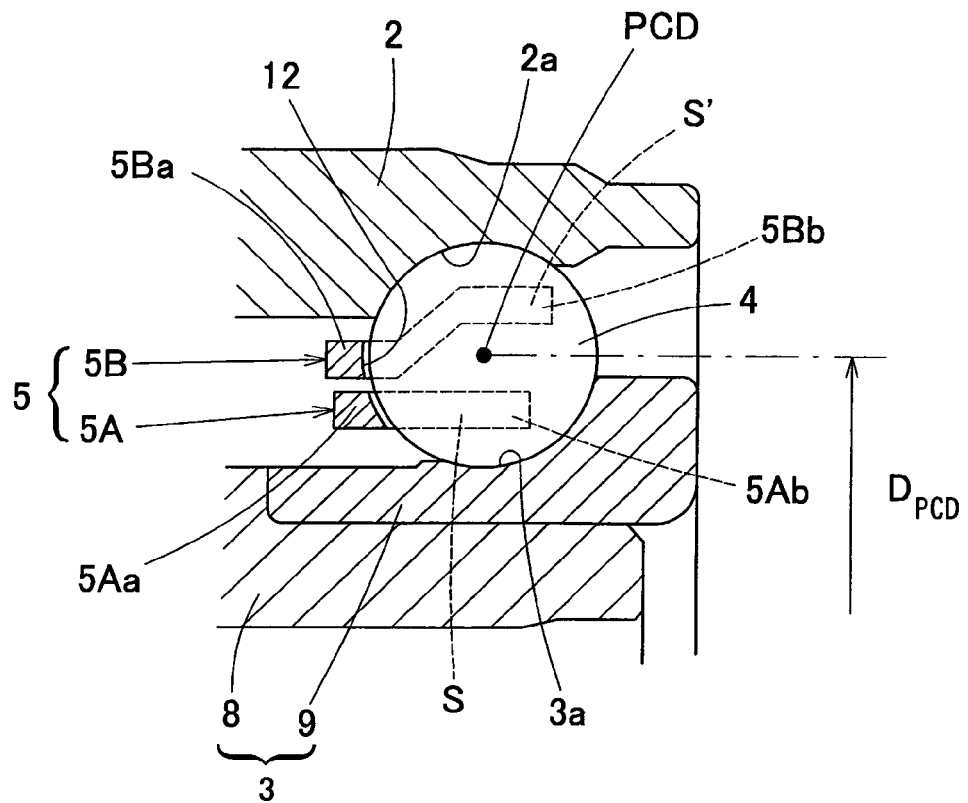
FIG. 4 is a fragmentary longitudinal view showing an important portion of the wheel support bearing assembly according to a third preferred embodiment of the present invention.
Figure 5:
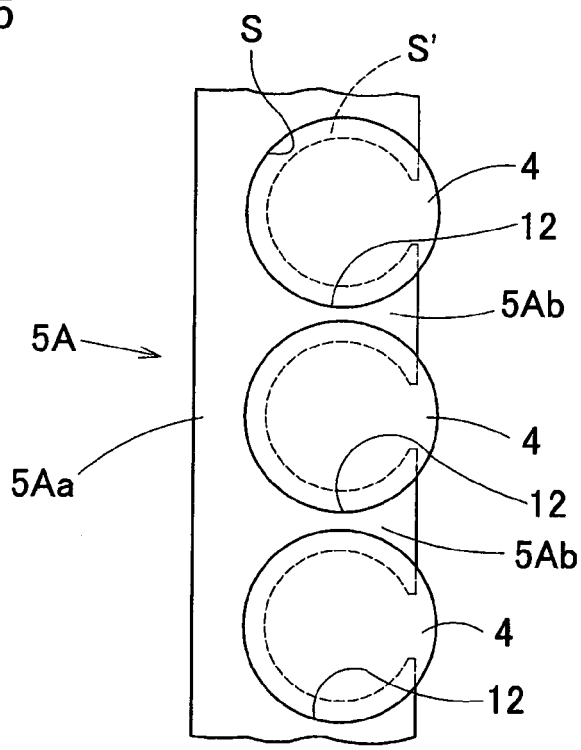
FIG. 5 is a fragmentary development view of a retainer segment employed in the wheel support bearing assembly shown in FIG. 4.

FIGS. 4 and 5 illustrates a third preferred embodiment of the present invention. The wheel support bearing assembly shown in FIGS. 4 and 5 is substantially similar to that of the first embodiment shown in FIGS. 1A to 2C, except that the ball retainer 5 is made up of a pair of separate retainer segments 5A and 5B. The retainer segments 5A and 5B of each pair are positioned one above the other in a radial direction within the annular bearing space between the outer and inner members 2 and 3.

Each of the retainer segments 5A and 5B includes a ring body 5Aa or 5Ba and a plurality of generally comb-shaped pillars 5Ab or 5Bb so formed integrally with the ring body 5Aa or 5Ba as to protrude therefrom and spaced an equal distance from each other in a direction circumferentially of the ring body 5Aa or 5Ba, with a ball accommodating pocket 12 defined between the neighboring pillars 5Ab or 5Bb. The inner and outer retainer segments 5A and 5B are so positioned as to allow the pillars 5Ab and 5Bb to extend in the same axial direction outwardly from the respective ring bodies 5Aa and 5Ba.

The inner retainer segment 5A is utilized to retain the balls 4 at a position radially inwardly of the pitch circle PCD, whereas the outer retainer segment 5B is utilized to retain the balls 4 at a position radially outwardly of the pitch circle PCD. In this third embodiment shown in FIGS. 4 and 5, the ring body 5Ba of the outer retainer segment 5B is held at a level approximately aligned with the pitch circle PCD whereas the pillars 5Bb extend diagonally outwardly and upwardly from the ring body 5a and are then bent to extend substantially parallel to the axial direction. Thus, each of the pillars 5Bb has an outwardly flaring portion and a horizontally extending portion on one side of the outwardly flaring portion remote from the ring body 5Ba.

FIG. 5 illustrates a portion of the inner retainer segment 5A in a development view. As shown therein, the inner retainer segment 5A is of a shape in which a spherical inner surface S of each of the pillars 5Ab is oriented diagonally radially outwardly so that the ball 4 can be freely received in and removed from the associated pocket 12 in a direction radially outwardly, but cannot be received in and removed from the associated pocket 12 in a direction radially inwardly. In contrast thereto, the outer retainer segment 5B is of a shape in which a spherical inner surface S' of each of the pillars 5Bb is oriented diagonally radially inwardly so that the ball 4 can be freely received in and removed from the associated pocket 12 in a direction radially inwardly, but cannot be received in and removed from the associated pocket 12 in a direction radially outwardly. As such, the balls 4 retained by the inner and outer retainer segments 5A and 5B cannot separate away from the respective pockets 12 in a direction either radially inwardly or radially outwardly. Also, since the inner surfaces S and S' of the pillars 5Ab and 5Bb represent a spherical shape and the respective spaces between the neighboring pillars 5Ab and between the neighboring pillars 5Bb are narrower at their tips than at their intermediate portions as shown in FIG. 5, the balls 4 do not separate from the respective pockets 12 through the tips of the pillars 5Ab and 5Bb.

Even in the third embodiment shown in FIGS. 4 and 5, since the balls 4 are retained by the ball retainer 5 while adjoining directly in a non-contact fashion relative to each other on the pitch circle PCD, the number of the balls 4 employable can be increased even though the wheel support bearing assembly makes use of the ball retainers. Accordingly, not only can the load acting on the individual balls 4 be reduced, but the lifetime of the bearing assembly can also be increased with no problem associated with the strength of each of the ball retainers 5.

Also, since the ball retainer 5 is made up of the separate inner and outer retainer segments 5A and 5B, each of the retainer segments 5A and 5B can have a simplified shape, while allowing the neighboring balls 4 to directly adjoin in a non-contact fashion on the pitch circle PCD, and can easily be manufactured by the use of, for example, an injection molding technique.

Other structural features of and effects brought about by the third embodiment shown in FIGS. 4 and 5 are substantially similar to those of the first embodiment shown in FIGS. 1A to 2C and, accordingly, the details thereof are not reiterated for the sake of brevity.

Figure 6:
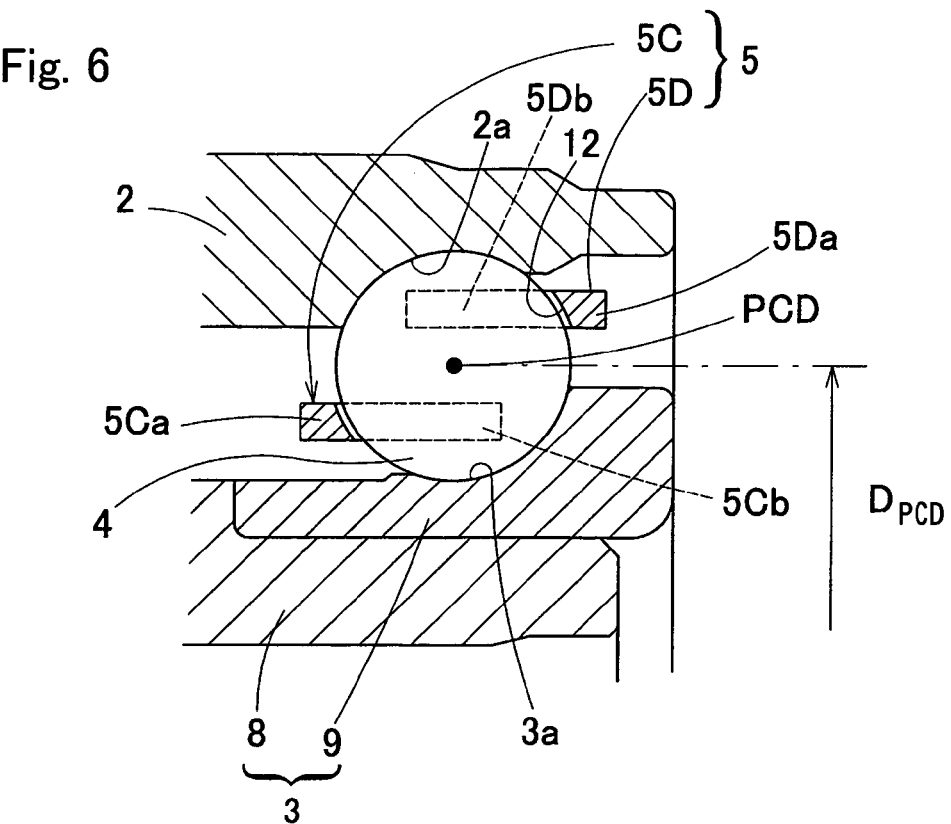
FIG. 6 is a view similar to FIG. 4, showing an important portion of the wheel support bearing assembly according to a fourth preferred embodiment of the present invention.

A fourth preferred embodiment of the present invention is shown in FIG. 6. This fourth embodiment of FIG. 6 is substantially similar to the first embodiment of FIGS. 1A to 2C, but differs therefrom in that the ball retainer 5 is made up of a pair of separate retainer segments 5C and 5D, which are offset in the axial direction with respect to the row of the balls 4. More specifically, each of the retainer segments 5C and 5D includes a ring body 5Ca or 5Da and a plurality of generally comb-shaped pillars 5Cb or 5Db so formed integrally with the ring body 5Ca or 5Da as to extend therefrom and spaced an equal distance from each other in a direction circumferentially of the ring body 5Ca or 5Da, with a ball accommodating pocket 12 defined between the neighboring pillars 5Cb or 5Db.

The retainer segment 5C positioned rearwardly of the bearing portion including the right or inboard row of the balls 4 is utilized to retain the balls 4 at a position radially inwardly of the pitch circle PCD, whereas the retainer segment 5D positioned forwardly of the bearing portion is utilized to retain the balls 4 at a position radially outwardly of the pitch circle PCD. As is the case with the pillars 5Ab and 5Bb in the third embodiment of FIGS. 4 and 5, the pillars 5Cb and 5Db have their inner surfaces oriented diagonally radially outwardly and diagonally radially inwardly, respectively, to thereby avoid an accidental separation of the balls 4 and the respective spaces between the neighboring pillars 5Cb and between the neighboring pillars 5Db are narrower at their tips than at their intermediate portions so that the balls 4 cannot separate from the respective pockets 12 through the tips of the pillars 5Cb and 5Db.

Even in this fourth embodiment of FIG. 6, since the balls 4 are retained by the ball retainer 5 while adjoining directly in a non-contact fashion relative to each other on the pitch circle PCD, the number of the balls 4 employable can be increased even though the wheel support bearing assembly makes use of the ball retainers. Accordingly, not only can the load acting on the individual balls 4 be reduced, but the lifetime of the bearing assembly can also be increased with no problem associated with the strength of each of the ball retainers 5.

Also, since the ball retainer 5 is made up of the separate retainer segments 5C and 5D, each of the retainer segments 5C and 5D can have a simplified shape, while allowing the neighboring balls 4 to directly adjoin in a non-contact fashion on the pitch circle PCD, and can easily be manufactured by the use of, for example, an injection molding technique.

Figure 7:
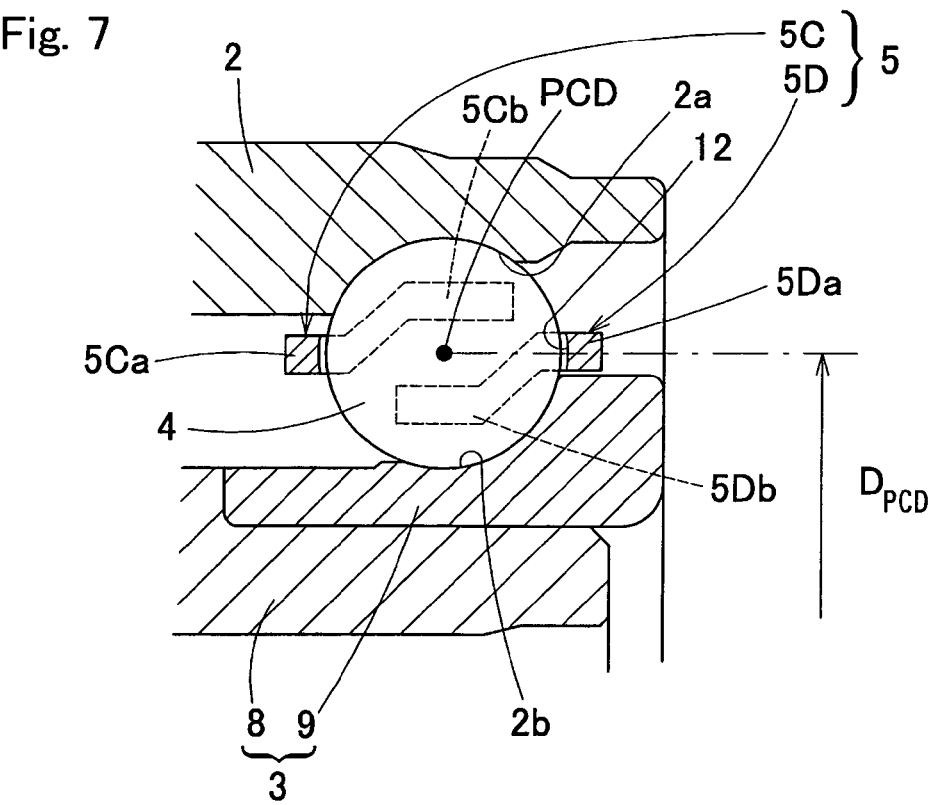
FIG. 7 is a view similar to FIG. 4, showing an important portion of the wheel support bearing assembly according to a fifth preferred embodiment of the present invention.

Other structural features of and effects brought about by the fourth embodiment shown in FIG. 6 are substantially similar to those of the first embodiment shown in FIGS. 1A to 2C and, accordingly, the details thereof are not reiterated for the sake of brevity.

Where the ball retainer 5 is made up of the separate retainer segments 5C and 5D offset in the axial direction with respect to the row of the balls 4 such as in the fourth embodiment shown in FIG. 6, the rear-side retainer segment 5C and the front-side retainer segment 5D may be utilized to support the balls 4 at respective positions radially outwardly and radially inwardly of the pitch circle PCD such as in a fifth preferred embodiment shown in FIG. 7. In this fifth embodiment, the ring body 5Ca of the retainer segment 5C is held at a level approximately aligned with the pitch circle PCD whereas the pillars 5Cb extend diagonally outwardly and upwardly from the ring body 5Ca and are then bent to extend substantially parallel to the axial direction. The ring body 5Da of the retainer segment 5D is held at a level approximately aligned with the pitch circle PCD whereas the pillars 5Db extend diagonally inwardly and downwardly from the ring body 5Da and are then bent to extend substantially parallel to the axial direction.

In describing any one of the foregoing embodiments of the present invention, reference has been made to the wheel support bearing assembly 1 of a third generation type. However, the present invention can be equally applied to the wheel support bearing assembly regardless of the generation type, i.e., any of the first to fourth generation types.

Also, in any one of the foregoing embodiments, the use of the two ball retainers 5 of the design described above is not always essential and one of them may be dispensed with. By way of example, considering that the load, which will act on the outboard (left-side) row of the balls 4, is generally relatively small as compared with that on the inboard (right-side) row of the balls 4, the number of the balls 4 of the outboard row may be smaller than that of the inboard row and only one ball retainer 5 may be used to retain the inboard row of the balls 4. In such case, the outboard row of the balls 4 may be operatively retained by any known standard ball retainer (not shown), which allows the neighboring balls 4 to confront with each other through the corresponding pillar at a location lying on the pitch circle PCD.

Figure 8:
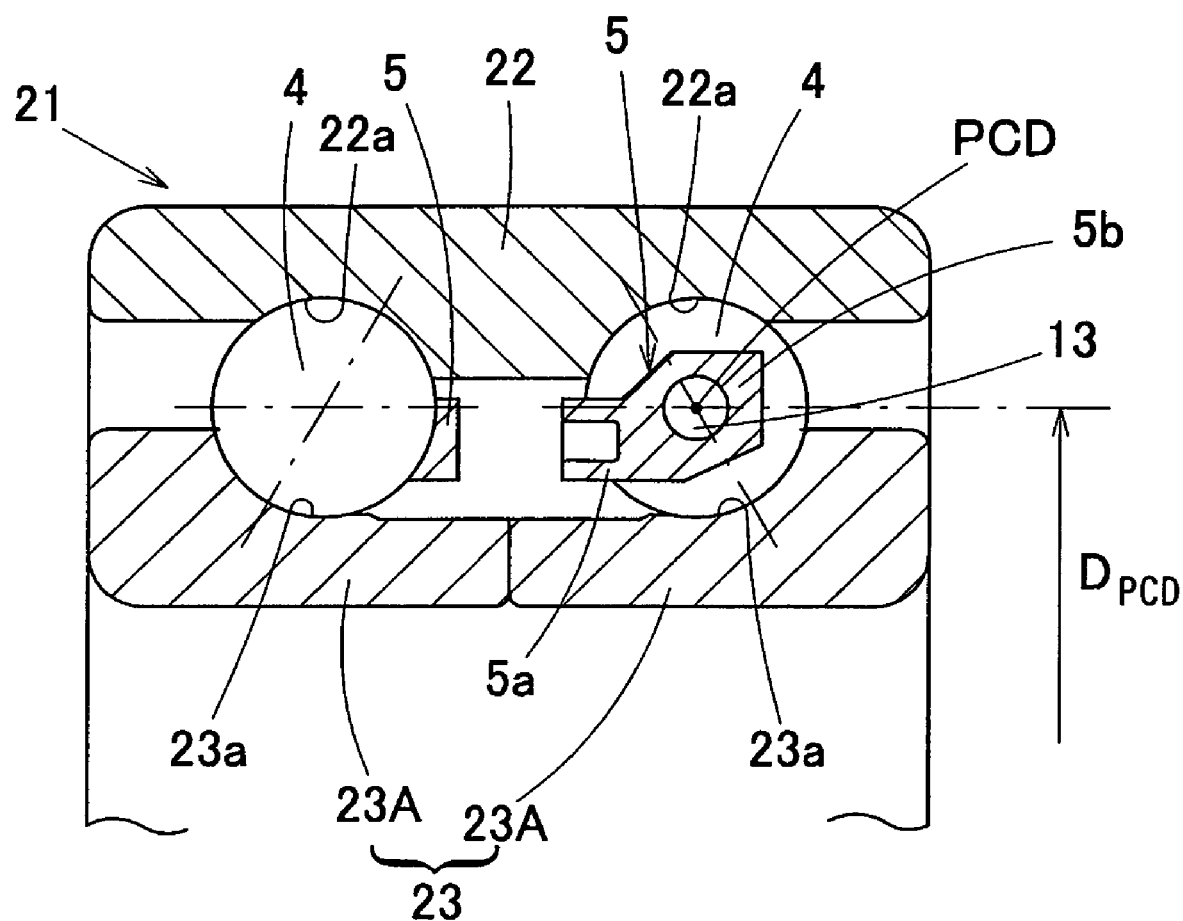
FIG. 8 is a fragmentary longitudinal sectional view, showing an important portion of the wheel support bearing assembly according to a sixth preferred embodiment of the present invention.

According to a sixth preferred embodiment shown in FIG. 8, the present invention is shown as applied to a dual row angular ball bearing 21. This dual row angular ball bearing 21 includes an outer race 22, an inner race 23 positioned inside the outer race 22 with an annular bearing space defined between it and the outer race 22, and dual rows of balls 4 operatively accommodated within the annular bearing space. Each of the rows of the balls 4 is retained by a respective ball retainer 5 of a design effective to allow the balls 4 of the corresponding row to be retained having been circumferentially spaced an equal distance from each other while allowing the neighboring balls 4 to adjoin directly in a non-contact fashion relative to each other on the pitch circle PCD.

The outer race 22 is a solid element having an inner peripheral surface formed with inboard and outboard raceways 22a for partially receiving the balls 4 of the respective rows. On the other hand, the inner race 23 is of two-piece construction including two inner race segments 23A and 23B axially aligned with each other and each having an outer peripheral surface formed with an inboard or outboard raceway 23a. The raceways 22a and 23a are provided at a contact angle effective to achieve a back-to-back alignment.

Each of the ball retainers 5 employed in the angular ball bearing 21 is identical with the first embodiment of FIGS. 1A to 2C. However, it may be identical with any of the second to fifth embodiments of FIGS. 3 to 7.

Even in this angular ball bearing 21, as is the case with the wheel support bearing assembly 1 according to any one of the foregoing embodiments, the number of the balls employable can be increased even though the wheel support bearing assembly makes use of the ball retainers. Accordingly, not only can the load acting on the individual balls 4 be reduced, but the lifetime of the bearing assembly can also be increased with no problem associated with the strength of each of the ball retainers 5.

Although the angular ball bearing 21 according to the sixth embodiment shown in FIG. 8 can be employed in practice in numerous applications, it may be used as a bearing constituting, for example, the wheel support bearing assembly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly comprising:
   an outer member having an inner peripheral surface formed with axially spaced outer raceways defined therein;
   an inner member positioned inside the outer member with an annular bearing space defined between the inner member and the outer member, and having an outer peripheral surface formed with inner raceways defined therein in alignment with the outer raceways;
   inboard and outboard rows of balls accommodated operatively within the annular bearing space and received in part in the outer raceways and in part in the inner raceways; and
   ball retainers retaining the inboard and outboard rows of the balls, wherein the neighboring balls in one or both of the inboard and outboard rows are retained by the corresponding ball retainer while approaching directly in a non-contact fashion relative to each other on a pitch circle,
   wherein the ball retainer comprises first and second retainer segments positioned radially inwardly and outwardly relative to each other within the annular bearing space, respectively, each of the first and second retainer segments comprising a ring body and a plurality of comb-shaped pillars so formed integrally with the ring body as to extend from the ring body with a ball accommodating pocket defined between the neighboring pillars; wherein the first and second retainer segments retain the balls at respective locations radially inwardly and outwardly of the pitch circle; and wherein the pillars of those first and second retainer segments extend in the same axial direction.

2. A wheel support bearing assembly comprising:
   an outer member having an inner peripheral surface formed with axially spaced outer raceways defined therein;
   an inner member positioned inside the outer member with an annular bearing space defined between it and the outer member, and having an outer peripheral surface formed with inner raceways defined therein in alignment with the outer raceways;
   inboard and outboard rows of balls accommodated operatively within the annular bearing space and received in part in the outer raceways and in part in the inner raceways; and
   ball retainers retaining the inboard and outboard rows of the balls, wherein the neighboring balls in one or both of the inboard and outboard rows are retained by the corresponding ball retainer while approaching directly in a non-contact fashion relative to each other on a pitch circle,
   wherein the ball retainer comprises separate first and second retainer segments offset in the axial direction with respect to the row of the balls, each of the first and second retainer segments comprising a ring body and a plurality of comb-shaped pillars so formed integrally with the ring body as to extend from the ring body with a ball accommodating pocket defined between the neighboring pillars; and wherein the first and second retainer segments retain the balls at respective locations radially inwardly and outwardly of the pitch circle.

3. A dual row angular ball bearing comprising:
   ball retainers retaining respective rows of balls, one or both of the ball retainers retaining the balls to allow the neighboring balls to approach directly in a non-contact fashion relative to each other on a pitch circle of the row of the balls,
   wherein one or both of the ball retainers comprises first and second retainer segments positioned radially inwardly and outwardly relative to each other,
   each of the first and second retainer segments comprises
      a ring body, and
      a plurality of comb-shaped pillars so formed integrally with the ring body as to extend from the ring body with a ball accommodating pocket defined between the neighboring pillars,
   the first and second retainer segments retain the balls at respective locations radially inwardly and outwardly of the pitch circle, and
   the pillars of the first and second retainer segments extend in the same axial direction.

4. A wheel support bearing assembly comprising:
   an outer member having an inner peripheral surface formed with axially spaced outer raceways defined therein;
   an inner member positioned inside the outer member with an annular bearing space defined between the inner member and the outer member, and having an outer peripheral surface formed with inner raceways defined therein in alignment with the outer raceways;
   inboard and outboard rows of balls accommodated operatively within the annular bearing space and received in part in the outer raceways and in part in the inner raceways; and
   ball retainers retaining the inboard and outboard rows of the balls, wherein the neighboring balls in one or both of the inboard and outboard rows are retained by the corresponding ball retainer while approaching directly in a non-contact fashion relative to each other on a pitch circle,
   wherein the ball retainer comprises separate first and second retainer segments offset in opposing axial directions with respect to the row of the balls,
   each of the first and second retainer segments comprises
      a ring body, and
      a plurality of comb-shaped pillars so formed integrally with the ring body as to extend from the ring body with a ball accommodating pocket defined between the neighboring pillars,
   the respective ring bodies are approximately aligned with the pitch circle, pillars of the first retainer segment extend diagonally, radially outwardly from the first retainer segment ring body, and then are bent to extend substantially axially, and pillars of the second retainer segment extend diagonally, radially inwardly from the second retainer segment ring body, and then are bent to extend substantially axially.

5. The wheel support bearing assembly as claimed in claim 4, wherein the pillars are bent to extend substantially axially at an axial position prior to reaching the an axial position of the pitch circle, and axially extend past the axial position of the pitch circle.

6. A wheel support bearing assembly comprising:

an outer member having an inner peripheral surface formed with axially spaced outer raceways defined therein;

an inner member positioned inside the outer member with an annular bearing space defined between the inner member and the outer member, and having an outer peripheral surface formed with inner raceways defined therein in alignment with the outer raceways;

inboard and outboard rows of balls accommodated operatively within the annular bearing space and received in part in the outer raceways and in part in the inner raceways; and ball retainers retaining the inboard and outboard rows of the balls, wherein the neighboring balls in one or both of the inboard and outboard rows are retained by the corresponding ball retainer while approaching directly in a non-contact fashion relative to each other on a pitch circle, wherein the ball retainer comprises a ring body and a plurality of comb-shaped pillars so formed integrally with the ring body as to extend from the ring body with a ball accommodating pocket defined between the neighboring pillars and wherein a throughhole is defined in each of the pillars at a location aligned with the pitch circle, wherein a tip portion of each pillar has an inner flat surface positioned radially inwardly of the pitch circle and an inner spherical surface positioned radially outwardly of the pitch circle.

* * * * *